(12) United States Patent
Moon et al.

(10) Patent No.: US 8,270,060 B2
(45) Date of Patent: Sep. 18, 2012

(54) INFRARED RAY TRANSMITTANCE CONTROLLING PANEL INCLUDING COLOR MODIFYING LAYER

(75) Inventors: Dong-Gun Moon, Suwon-si (KR);
Myun-Gi Shim, Suwon-si (KR);
Soo-Ho Park, Suwon-si (KR); Mi-Hyun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 103 days.

(21) Appl. No.: 12/703,735

(22) Filed: Feb. 10, 2010

(65) Prior Publication Data
US 2011/0075243 A1    Mar. 31, 2011

Related U.S. Application Data

(60) Provisional application No. 61/245,977, filed on Sep. 25, 2009.

(51) Int. Cl.
*G02F 1/23* (2006.01)
(52) U.S. Cl. ...................................... 359/288
(58) Field of Classification Search .............. 359/288, 359/245, 248, 254; 349/20, 86, 182
See application file for complete search history.

(56) References Cited

U.S. PATENT DOCUMENTS

| | | | |
|---|---|---|---|
| 6,084,702 A * | 7/2000 | Byker et al. ............... | 359/288 |
| 6,416,890 B1 | 7/2002 | Terneu et al. | |
| 6,673,427 B2 | 1/2004 | Guiselin et al. | |
| 2003/0162037 A1 | 8/2003 | Russo et al. | |
| 2005/0014444 A1 * | 1/2005 | Harata et al. ................ | 446/227 |
| 2008/0008857 A1 | 1/2008 | Kalkanoglu et al. | |
| 2011/0111204 A1 * | 5/2011 | Veerasamy et al. ........ | 428/312.8 |

FOREIGN PATENT DOCUMENTS

| | | |
|---|---|---|
| JP | 9-328331 | 12/1997 |
| JP | 2002-086606 | 3/2002 |
| JP | 2006-256902 | 9/2006 |
| KR | 10-2002-0033579 | 5/2002 |
| KR | 10-2003-0046502 | 6/2003 |
| WO | WO 00/21748 A1 | 4/2000 |
| WO | WO 2008/087077 A1 | 7/2008 |

OTHER PUBLICATIONS

Parkin, et al., *Intelligent Thermochromic Windows*, Journal of Chemical Education, vol. 83 No. 3, Mar. 2006, pp. 393-400.

European Search Report dated Mar. 1, 2011, for corresponding European Patent application 10251645.7, noting listed references in this IDS.

KIPO Office action dated Nov. 24, 2011, for corresponding Korean Patent application 10-2010-0056742, 4 pages.

KIPO Notice of Allowance dated May 4, 2012, for corresponding Korean Patent application 10-2010-0056742, (5 pages).

* cited by examiner

*Primary Examiner* — Ricky Mack
*Assistant Examiner* — Tuyen Tra
(74) *Attorney, Agent, or Firm* — Christie, Parker & Hale, LLP

(57) ABSTRACT

A panel includes a transparent substrate, a thermochromic layer, and a color modifying layer that includes an organic material. The transparent substrate, the color modifying layer and the thermochromic layer are stacked together.

14 Claims, 3 Drawing Sheets

INFRARED RAY TRANSMITTANCE CONTROLLING PANEL INCLUDING COLOR MODIFYING LAYER

RELATED APPLICATIONS

This application claims priority to and the benefit of U.S. Provisional Application No. 61/245,977 filed Sep. 25, 2009, in the U.S. Patent and Trademark Office, the entire content of which is incorporated by reference herein.

BACKGROUND

1. Field

One or more embodiments of the present invention relate to an infrared ray transmittance controlling panel.

2. Description of the Related Art

With the rapid increase of the price of chemical energy sources such as petroleum, demand for development of a new energy source is increasing. However, it is also important to control energy consumption. In a typical household, 60% or more of energy is consumed in heating and cooling. In particular, about 24% of the consumed energy escapes through windows of typical houses and buildings.

Various attempts have been made to reduce the amount of energy that escapes through windows. For example, the size of windows may be controlled, or high insulation window panes may be installed.

An example of a high insulation window pane is a thermochromic window pane which includes a material whose infrared ray transmittance is controlled.

SUMMARY

One or more embodiments of the present invention are directed to an infrared ray transmittance controlling panel (e.g., infrared ray transmittance controlling glass or glass panel) including a color modifying layer.

According to one or more embodiments of the present invention, a panel includes: a transparent substrate; a thermochromic layer; and a color modifying layer including an organic material. The transparent substrate, the color modifying layer and the thermochromic layer are stacked together.

The organic material of the color modifying layer may be configured to absorb light with a central light absorption wavelength between about 550 nm and about 780 nm.

In one embodiment, thermochromic layer may be between the color modifying layer and the transparent substrate. In another embodiment, the color modifying layer may be between the thermochromic layer and the transparent substrate. In another embodiment, the transparent substrate may be between the thermochromic layer and the color modifying layer.

The transparent substrate may include a material selected from the group consisting of glass, indium tin oxide (ITO), polymer film, and combinations thereof.

The transparent substrate may include a coloring material. The coloring material may include a material selected from the group consisting of nickel oxide (NiO), chromium oxide ($Cr_2O_3$), cobalt oxide (CoO), and combinations thereof.

The thermochromic layer may include vanadium dioxide or a plurality of vanadium dioxide layers. The thermochromic layer may include a vanadium dioxide layer and a dielectric layer. In one embodiment, the dielectric layer may include a color pigment adapted to contribute to the color of the panel. In other embodiments, the dielectric layer may include a material selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and combinations thereof.

The organic material of the color modifying layer may include an organic pigment having a green-based or blue-based color.

The organic material of the color modifying layer may include a material selected from the group consisting of $C_{17}H_{18}ClN_3O_4$, $C_{48}H_{48}ClN_5O_3$, $C_{43}H_{47}N_2NaO_6S_2$, $C_{22}H_{14}N_6Na_2O_9S_2$, and combinations thereof.

The color modifying layer may have a thickness between about 0.01 µm and about 50 µm.

BRIEF DESCRIPTION OF THE DRAWINGS

These and/or other aspects will become apparent and more readily appreciated from the following description of the embodiments, taken in conjunction with the accompanying drawings of which.

Figure 1:
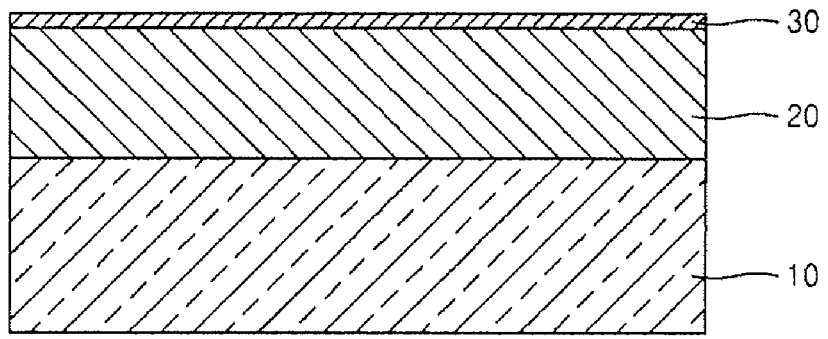
FIGS. 1, 2 and 3 are cross-sectional views illustrating infrared ray transmittance controlling panels according to embodiments of the present invention.

EXPLANATION OF REFERENCE NUMERALS DESIGNATING SOME OF THE ELEMENTS OF THE DRAWINGS

100a, 100b, 100c: infrared ray transmittance controlling panel
10: transparent substrate
20: thermochromic layer
30: color modifying layer

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

An infrared ray transmittance controlling panel according to an embodiment of the present invention includes a transparent substrate, a thermochromic layer, and a color modifying layer.

The transparent substrate is a flat panel that may be used as a window pane, and may be formed of any glass or transparent material as long as it is transparent and flat. The material, thickness, size, or shape of the transparent substrate may be selected according to purposes or desired characteristics. Alternatively or in addition to glass, the transparent substrate may include any other suitable transparent material such that the transparent substrate can be used as a window pane.

For example, the transparent substrate may be an indium tin oxide (ITO) substrate, an ITO substrate on which a coloring material (e.g., NiO, $Cr_2O_3$, CoO, etc.) is deposited, a polymer film such as polyester, polysulfone, polycarbonate, polyamide, polystyrene, polymethylpentane, polyethyleneterephthalate, or polyvinylchloride, or a substrate including a polymer film on which a coloring material is deposited.

Also, the transparent substrate (e.g., glass) may be surface-treated in order to easily coat a thermochromic layer or a color modifying layer thereon. The surface treatment may be performed using one or more of conventional methods known to those skilled in the art, such as grinding the surface to remove cracks, removing impurities on the surface of the transparent substrate, or to increase the surface strength through heat treatment.

In the thermochromic layer, metal insulator transition (MIT) occurs at a predetermined temperature (e.g., phase change temperature). That is, if an ambient temperature is higher than a phase change temperature of the thermochromic layer, the thermochromic layer blocks or reflects infrared rays. If the ambient temperature is lower than the phase change temperature of the thermochromic layer, the thermochromic layer transmits infrared rays.

The thermochromic layer may be formed of vanadium oxide (VxOy), or may be formed of any suitable material whose infrared ray transmittance has the greatest variation around a transition temperature. Vanadium oxide may include a vanadium dioxide (VxOy) including vanadium and oxygen in a stoichiometric ratio of 1:2, a vanadium oxide (VOx, x<2), or a vanadium pentoxide (VxOy) (x:y=2:5). Vanadium oxide (VOx) (x<2) is included because it exists as vanadium dioxide (VxOy) (x:y=1:2) in an environment where vanadium oxide exists uniformly but a phase thereof is less oxidized in an environment where vanadium oxide exists less uniformly and because according to circumstances, vanadium atoms may exist in a metal state in the vanadium oxide.

In particular, vanadium dioxide ($VO_2$) is known to have a transition temperature of about 68° C. That is, at a temperature higher than 68° C., vanadium dioxide ($VO_2$) exists in a metal state and blocks or reflects infrared rays. At a temperature lower than 68° C., vanadium dioxide ($VO_2$) exists in a semiconductor state and transmits infrared rays.

The thermochromic layer may be formed of a single vanadium oxide layer or a plurality of vanadium oxide layers. Also, the thermochromic layer may be formed of a stack including a vanadium oxide layer and a dielectric layer. For example, the thermochromic layer may be formed of a first vanadium oxide layer/a dielectric layer/a second vanadium oxide layer. According to another embodiment, the thermochromic layer may be formed of a first dielectric layer/a first vanadium oxide layer/a second dielectric layer/a second vanadium oxide layer/a third dielectric layer. The dielectric layer may include at least one selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and combinations thereof.

The thermochromic layer may be formed using various methods. Examples of the method of forming the thermochromic layer include chemical vapor deposition (CVD), sputtering, and coating.

The thermochromic layer including vanadium oxide has a yellowish color due to the unique color of the vanadium oxide. However, visually, a window pane having a yellowish color does not create a good impression. Consumers generally prefer window panes having green, blue, or gray based colors.

The color modifying layer modifies the color of the infrared ray transmittance controlling panel according to embodiments of the present invention. For example, the color modifying layer reduces the yellowish color of the thermochromic layer and adjusts the color of the infrared ray transmittance controlling panel to have a grayish color.

The color modifying layer according to one embodiment includes an organic material. The organic material may be an organic pigment having a bluish color or a greenish color so as to decrease the yellowish color of the thermochromic layer. The organic pigment may have a central light absorption wavelength of about 550 nm to about 780 nm in order to have a predetermined color. Accordingly, in this embodiment, light having a wavelength in the range of about 550 nm to about 780 nm is absorbed by the color modifying layer, and thus the yellowish or reddish color is not visible to human eyes. Also, the color modifying layer transmits most light having a wavelength corresponding to the bluish color. Accordingly, the infrared ray transmittance controlling panel according to embodiments of the present invention may show bluish, greenish, or grayish color overall.

Examples of the organic pigment used for the color modifying layer include: 1-carbamoyl-7-(diethylamino)-3,4-dihydroxyphenoxazin-5-ium chloride ($C_{17}H_{18}ClN_3O_4$) of Formula 1; (3,6-bis(diethylamino)-9-[2-[[[9-(diethylamino)-5H-benzo[a]phenoxazin-5-ylidene]amino]carbonyl]phenyl] xanthylium chloride ($C_{48}H_{48}ClN_5O_3$) of Formula 2; sodium 2-(7-(3,3-dimethyl-1-(4-sulfonatobutyl)benz(e)indolin-2-ylidene)hepta-1,3,5-trien-1-yl)-3,3-dimethyl-1-(4-sulfonatobutyl)benz[e]indolinium) ($C_{43}H_{47}N_2NaO_6S_2$) of Formula 3; disodium 4-amino-5-hydroxy-3-[(3-nitrophenyl)azo]-6-(phenylazo)naphthalene-2,7-disulphonate ($C_{22}H_{14}N_6Na_2O_9S_2$) of Formula 4; and combinations of these. However, the organic pigment is not limited thereto according to embodiments of the present invention, and may include any organic material having a central light absorption wavelength in the range of about 550 nm to about 780 nm.

<Formula 1>

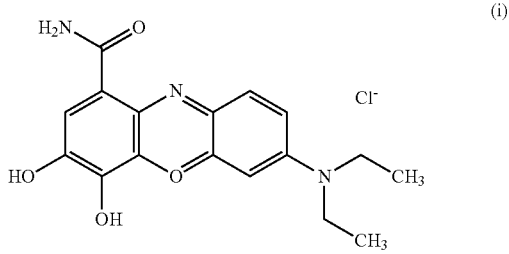

(i)

$C_{17}H_{18}ClN_3O_4$ of Formula 1 is an organic pigment having a bluish color and has a central light absorption wavelength of about 640 nm.

<Formula 2>

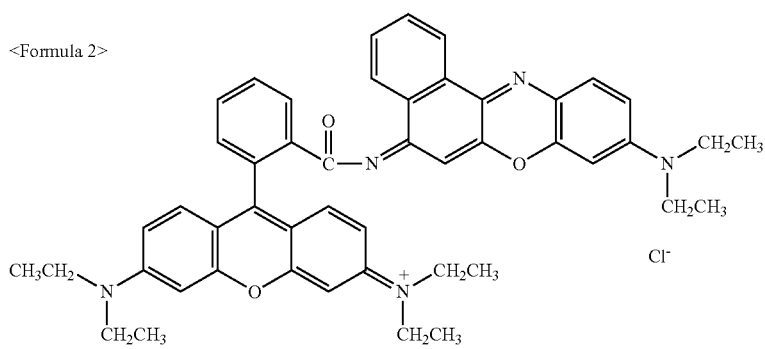

$C_{48}H_{48}ClN_5O_3$ of Formula 2 is an organic pigment having a bluish color and has a central light absorption wavelength of about 552 nm.

<Formula 3>

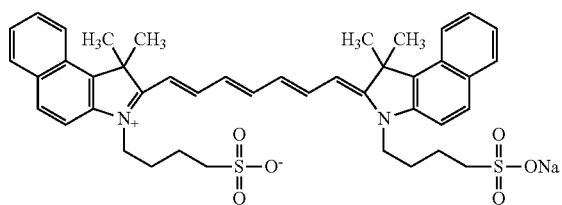

$C_{43}H_{47}N_2NaO_6S_2$ of Formula 3 is an organic pigment having a greenish color and has a central light absorption wavelength of about 775 nm.

<Formula 4>

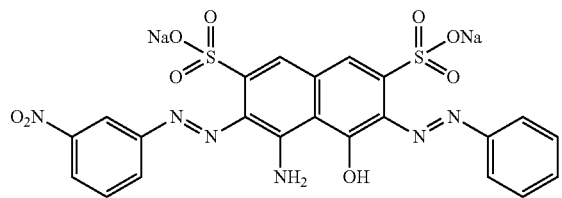

$C_{22}H_{14}N_6Na_2O_9S_2$ of Formula 4 is an organic pigment having a bluish color and has a central light absorption wavelength of about 602 nm.

When the color modifying layer is formed of an organic material or an organic pigment as described above, a range of an absorption spectrum that absorbs predetermined light may be less than when an inorganic material such as a transition metal, an alkaline earth metal, or the like is used. In other words, the resulting infrared transmission controlling panel may have a narrow range of absorption spectrum. Accordingly, light having a predetermined wavelength may be selectively absorbed. In addition, compared to inorganic materials, organic materials have a greater light absorption ratio at a predetermined wavelength, and thus even when the color modifying layer is contained in a window pane, the total transmittance of light may not be reduced.

According to one embodiment, the color modifying layer is formed to have a thickness in the range of about 0.01 μm to about 50 μm. If the thickness of the color modifying layer is less than 0.01 μm, a color correction effect of adjusting the color of vanadium oxide may not be obtained. If the thickness of the color modifying layer is greater than 50 μm, the transmittance of light may be abruptly decreased. The thickness of the color modifying layer is based on when organic materials in the amounts shown in Tables 1 and 2 below are used to form the color modifying layer. However, the color modifying layer is not limited thereto, and may be selectively adjusted according to an amount of an organic material. For example, when the amount of the organic material increases, the thickness of the color modifying layer is reduced so as to prevent a reduction in the transmittance of light.

The color modifying layer may be manufactured using various methods. For example, an organic material of one or more of Formulas 1 through 4 is mixed with a transparent material, and the mixture is coated on a transparent substrate (e.g., glass substrate) or a thermochromic layer. Examples of the coating method include screen printing and methods using various coating apparatuses such as a table coater, a cap coater, a bar coater, and a blade coater. After the coating is completed, a post-process for drying and curing is required. Examples of the post-process include UV curing, IR curing, a thermal curing method, and a drying method using heat or wind. If a surface quality of the color modifying layer is not desirable after the coating, the coated color modifying layer may be planarized using a base material having a uniform surface (e.g., a film or a glass), and then the post-process may be performed.

However, the method of forming the color modifying layer is not limited to the above-described coating, and sputtering, CVD, or other methods well-known in the art may also be used.

Figure 2:
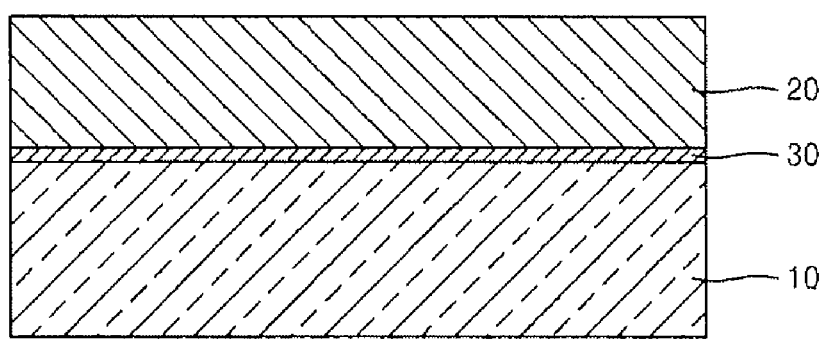
Figure 3:
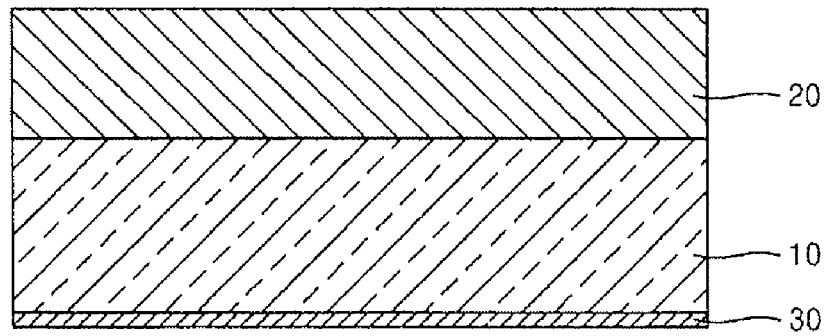

FIGS. 1 through 3 are cross-sectional views illustrating infrared ray transmittance controlling panels 100a, 100b, and 100c including a color modifying layer, according to embodiments of the present invention.

Referring to FIG. 1, the infrared ray transmittance controlling panel 100a includes a thermochromic layer 20 stacked on a transparent substrate 10 and a color modifying layer 30 formed on the thermochromic layer 20.

Referring to FIG. 2, the infrared ray transmittance controlling panel 100a may include a color modifying layer 30 disposed between a transparent substrate 10 and a thermochromic layer 20.

Referring to FIG. 3, the infrared ray transmittance controlling panel 100c may include a transparent substrate 10 and a thermochromic layer 20 sequentially stacked on a color modifying layer 30.

However, the shape or configuration of the infrared ray transmittance controlling panels 100a, 100b, and 100c is not limited thereto. The position and number of the color modifying layer 30 may be selected according to purposes or desired characteristics. In FIGS. 1 through 3, the color modifying layer 30 is formed only on one surface of the thermochromic layer 20 or the transparent substrate 10, but the color modifying layer 30 may also be formed on both surfaces of the thermochromic layer 20 or the transparent substrate 10. Also, the color modifying layer 30 may be formed on a single surface or both surfaces of each of double layers of a double window pane.

The transparent substrate in the panels of FIGS. 1 through 3 may include a material selected from the group consisting of glass, indium tin oxide (ITO), polymer film, and combinations thereof, or any other suitable transparent material.

When the color modifying layer 30 is formed as an outermost layer as illustrated in FIGS. 1 and 3, the infrared ray transmittance controlling panel 100a or 100c may be oriented such that the color modifying layer 30 is located indoors or in an inner portion of a double-layer panel (e.g., glass). This is because the color of the color modifying layer 30 may be changed or durability thereof may decrease due to strong ultraviolet rays if the color modifying layer 30 is exposed to the outside.

When the thermochromic layer 20 and the color modifying layer 30 are located adjacent to each other as illustrated in FIGS. 1 and 2, absorption of solar heat by the thermochromic layer 20 is increased due to a dark body color of the color modifying layer 30. Accordingly, a range for adjusting a transition temperature of the thermochromic layer 20 is set in consideration of solar heat absorption by the color modifying layer 30. When the thermochromic layer 20 is formed of vanadium oxide having a transition temperature of about 68° C., the content of an element (e.g., metal additive such as tungsten (W)) for reducing the transition temperature may be reduced, and a large difference in transmittances above and below the transition temperature of the thermochromic layer 20 may be obtained. The difference in transmittances above and below the transition temperature of the thermochromic layer 20 decreases if a large amount of an element is added to reduce the transition temperature of vanadium oxide.

Table 1 shows the composition of a color modifying layer 1 of an infrared ray transmittance controlling panel (e.g., glass panel) according to an embodiment of the present invention.

TABLE 1

| Color modifying layer 1 | Central light absorption wavelength (nm) | WT % |
| --- | --- | --- |
| First organic material | 640 | 0.76 |
| Second organic material | 552 | 1.00 |
| Third organic material | 775 | 0.76 |
| Fourth organic material | 602 | 0.24 |

Here, the first organic material is $C_{17}H_{18}ClN_3O_4$ of Formula 1, the second organic material is $C_{48}H_{48}ClN_5O_3$ of Formula 2, the third organic material is $C_{43}H_{47}N_2NaO_6S_2$ of Formula 3, and the fourth organic material is $C_{22}H_{14}N_6Na_2O_9S_2$ of Formula 4.

The color modifying layer 1 includes 0.76 Wt % of the first organic material, 1.00 WT % of the second organic material, 0.76 WT % of the third organic material, and 0.24 WT % of the fourth organic material. The remaining content of the color modifying layer 1 consists of a transparent material or a solvent which functions as a binder.

Examples of the transparent material include a UV curing agent, an electron-beam curing agent, a thermal curing agent, an acrylic binder, and a transparent acrylic adhesive. Examples of the UV curing agent include an unsaturated polyesther resin, an acrylic resin, a thiol-olefin resin, and an epoxy resin. The electron-beam curing agent may be formed by combining a prepolymer and a polyfunctional vinyl monomer. Examples of the thermal curing agent include an urea thermal curing agent, a phenolic thermal curing agent, a vinyl acetate thermal curing agent, a nitril rubber thermal curing agent, an acrylic thermal curing agent, a neoprene rubber thermal curing agent, an epoxy resin thermal curing agent, a polyurethane thermal curing agent, and a silicone rubber thermal curing agent.

Table 2 shows the composition of a color modifying layer 2 of an infrared ray transmittance controlling panel according to another embodiment of the present invention.

TABLE 2

| Color modifying layer 2 | Central light absorption wavelength (nm) | WT % |
| --- | --- | --- |
| First organic material | 640 | 1.00 |
| Second organic material | 552 | 1.00 |
| Third organic material | 775 | 0.97 |
| Fourth organic material | 602 | 0.77 |

Here, the first organic material is $C_{17}H_{18}ClN_3O_4$ of Formula 1, the second organic material is $C_{48}H_{48}ClN_5O_3$ of Formula 2, the third organic material is $C_{43}H_{47}N_2NaO_6S_2$ of Formula 3, and the fourth organic material is $C_{22}H_{14}N_6Na_2O_9S_2$ of Formula 4.

The color modifying layer 2 includes 1.00 Wt % of the first organic material, 1.00 Wt % of the second organic material, 0.97 Wt % of the third organic material, and 0.77 Wt % of the fourth organic material. The remaining content of the color modifying layer 2 consists of a transparent material or a solvent which functions as a binder.

Hereinafter, the colors and transmittances of an infrared ray transmittance controlling panel including the color modifying layer 1 or the color modifying layer 2 in the manner as illustrated in FIGS. 1 through 3 will be described with reference to a color space.

Figure 4:
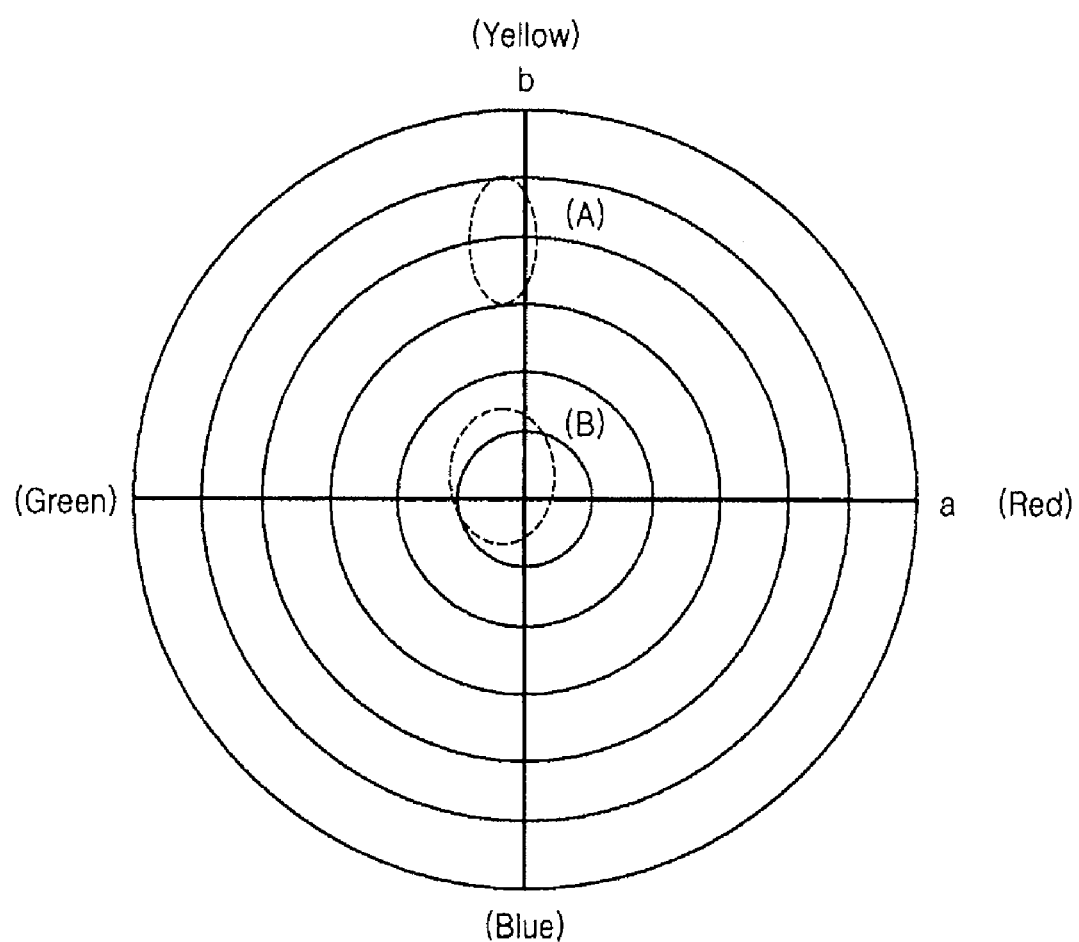
FIG. 4 illustrates the color space for explaining the color modifying principle of a color modifying layer according to an embodiment of the present invention.

FIG. 4 illustrates the color space for explaining the color modifying principle of color modifying layers according to embodiments of the present invention.

Table 3 shows a color space of vanadium oxide included in a thermochromic layer and a color space of the infrared ray transmittance controlling panels (e.g., glass panels) including the color modifying layers 1 and 2 according to the embodiments of the present invention.

The colors of materials may be determined by using the values of Table 3 with reference to the color space of FIG. 4.

TABLE 3

| Color space | L | a | b |
| --- | --- | --- | --- |
| Transparent substrate (e.g., glass) on which a vanadium oxide layer is formed | 84.33 | −1.66 | 40.65 |
| Infrared ray transmittance controlling panel (e.g., glass panel) including color modifying layer 1 | 45.87 | −0.20 | 7.86 |
| Infrared ray transmittance controlling panel (e.g., glass panel) including color modifying layer 2 | 42.75 | −0.92 | 4.89 |

Referring to FIG. 4, a center of a circular coordination system is 0, and a is a horizontal axis, and b is a vertical axis. The greater a positive absolute value of a, the more red the color is. The greater a negative absolute value of a, the more green the color is. The greater a positive absolute value of b, the more yellow the color is, and the greater a negative absolute value of b, the more blue the color is. L denotes the luminosity. According to one embodiment, description will focus on a and b, which are values representing color tones and saturation.

When using the results of Table 3 with reference to the color space of FIG. 4, the transparent substrate on which a vanadium oxide layer is formed is located in (A), and accordingly, the vanadium oxide layer has a yellowish color. Color space of the infrared ray transmittance controlling panel including the color modifying layer 1 or the color modifying layer 2 is located in (B) of FIG. 4. Accordingly, the infrared ray transmittance controlling panel including the color modifying layer 1 and the infrared ray transmittance controlling panel including the color modifying layer 2 have a grayish color.

Figure 5:
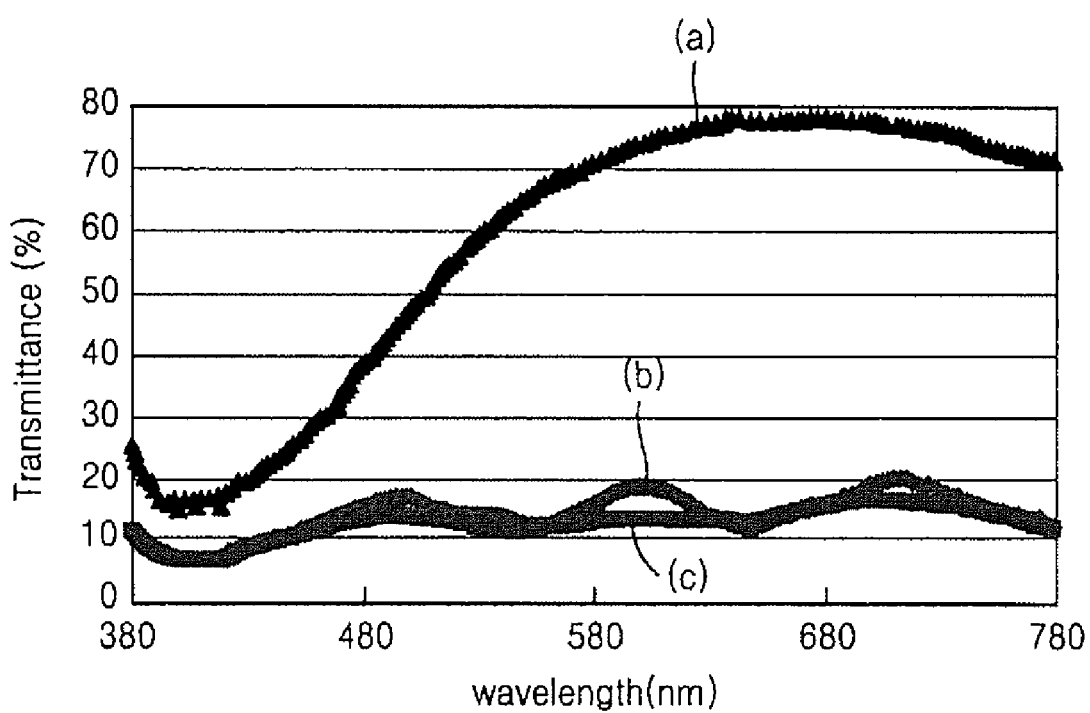
FIG. 5 is a graph showing a visible light transmittance of an infrared ray transmittance controlling glass including a color modifying layer, according to an embodiment of the present invention.

FIG. 5 is a graph showing transmittance of visible light of infrared ray transmittance controlling panels (e.g., infrared ray transmittance controlling glasses) including a color modifying layer according to embodiments of the present invention.

Referring to FIG. 5, a glass on which a thermochromic layer is formed (refer to (a) of FIG. 5) has an average transmittance of about 15% to about 30% in the range from 380 nm to 480 nm, and this is significantly lower than an average light transmittance in the range from 480 nm to 780 nm.

The infrared ray transmittance controlling panel (e.g., infrared ray transmittance controlling glass) including the color modifying layer 1 (refer to (b) of FIG. 5) and the infrared ray transmittance controlling panel (e.g., infrared ray transmittance controlling glass) including the color modifying layer 2 (refer to (c) of FIG. 5) according to one embodiments of the present invention have a transmittance of about 7% to about 15% in the range from 380 nm to 480 nm, which is similar to the average light transmittance in the range of 480 nm to 780 nm, that is, to the transmittance in the visible light area overall. Accordingly, the infrared ray transmittance controlling panel including the color modifying layer 1 or 2 may have a grayish color.

The infrared ray transmittance controlling panel according to embodiments of the present invention includes a thermochromic layer having an infrared ray transmittance that varies according to temperature. The thermochromic layer includes a vanadium oxide layer. Vanadium oxide has a unique yellowish color. However, the preferred color of window panes usually used in buildings or automobiles is gray, blue, or green-based.

The color modifying layer according to the embodiments of the present invention has a grayish color. Accordingly, colors desired by consumers may be obtained by using the infrared ray transmittance controlling panel according to the embodiments of the present invention.

In addition, an organic material is used to control the color of the color modifying layer according to the embodiments of the present invention, and thus a light absorption spectrum that absorbs predetermined light is narrow (i.e., has a narrow range of absorption spectrum). Also, since a light absorption ratio of the organic material at a predetermined wavelength is greater than that of an inorganic material, the total light transmittance is not reduced even when the color modifying layer is contained in a window pane.

It should be understood that the exemplary embodiments described herein should be considered in a descriptive sense only and not for purposes of limitation. It should also be understood that descriptions of features or aspects within each embodiment are to be considered as available or interchangeable with other similar features or aspects in other embodiments.

What is claimed is:

1. A panel comprising:
 a transparent substrate;
 a thermochromic layer comprising vanadium oxide: and
 a color modifying layer comprising an organic material having a central light absorbing wavelength between about 550 nm and about 780 nm,
 wherein the transparent substrate, the color modifying layer and the thermochromic layer are stacked together,
 wherein the organic material of the color modifying layer comprises a material selected from the group consisting of $C_{17}H_{18}ClN_3O_4$, $C_{48}H_{48}ClN_5O_3$, $C_{43}H_{47}N_2NaO_6S_2$, $C_{22}H_{14}N_6Na_2O_9S_2$, and combinations thereof.

2. The panel of claim 1, wherein the thermochromic layer is between the color modifying layer and the transparent substrate.

3. The panel of claim 1, wherein the color modifying layer is between the thermochromic layer and the transparent substrate.

4. The panel of claim 1, wherein the transparent substrate is between the thermochromic layer and the color modifying layer.

5. The panel of claim 1, wherein the transparent substrate comprises a material selected from the group consisting of glass, indium tin oxide (ITO), polymer film, and combinations thereof.

6. The panel of claim 1, wherein the transparent substrate comprises a coloring material.

7. The panel of claim 6, wherein the coloring material comprises a material selected from the group consisting of nickel oxide (NiO), chromium oxide ($Cr_2O_3$), cobalt oxide (CoO), and combinations thereof.

8. The panel of claim 1, wherein the thermochromic layer comprises a plurality of vanadium dioxide layers.

9. The panel of claim 1, wherein the thermochromic layer comprises a vanadium dioxide layer and a dielectric layer.

10. The panel of claim 9, wherein the dielectric layer comprises a color pigment adapted to contribute to the color of the panel.

11. The panel of claim 9, wherein the dielectric layer comprises a material selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), and combinations thereof.

12. The panel of claim 1, wherein the organic material of the color modifying layer comprises an organic pigment having a green-based or blue-based color.

13. The panel of claim 1, wherein the color modifying layer has a thickness between about 0.01 μm and about 50 μm.

14. A panel comprising:
 a transparent substrate;
 a thermochromic layer; and
 a color modifying layer comprising an organic material,
 wherein the transparent substrate, the color modifying layer and the thermochromic layer are stacked together, and
 wherein the organic material of the color modifying layer comprises a material selected from the group consisting of $C_{17}H_{18}ClN_3O_4$, $C_{48}H_{48}ClN_5O_3$, $C_{43}H_{47}N_2NaO_6S_2$, $C_{22}H_{14}N_6Na_2O_9S_2$, and combinations thereof.

* * * * *